US012620010B2

(12) United States Patent
Cofano et al.

(10) Patent No.: US 12,620,010 B2
(45) Date of Patent: May 5, 2026

(54) SECURE REFERRAL TRANSFER SERVICE

(71) Applicant: Goodwell Technologies, Inc., Bellevue, WA (US)

(72) Inventors: John Cofano, Sammamish, WA (US); David Boliek, Carnation, WA (US); Phillip Dellinger, Bothell, WA (US)

(73) Assignee: GOODWELL TECHNOLOGIES, INC., Bellevue, WA (US)

( * ) Notice: Subject to any disclaimer, the term of this patent is extended or adjusted under 35 U.S.C. 154(b) by 591 days.

(21) Appl. No.: 17/319,619

(22) Filed: May 13, 2021

(65) Prior Publication Data

US 2021/0358001 A1    Nov. 18, 2021

Related U.S. Application Data

(60) Provisional application No. 63/024,752, filed on May 14, 2020.

(51) Int. Cl.
| | |
|---|---|
| H04L 9/40 | (2022.01) |
| G06Q 10/087 | (2023.01) |
| G06Q 30/0601 | (2023.01) |
| H04L 51/02 | (2022.01) |

(52) U.S. Cl.
CPC ........ *G06Q 30/0611* (2013.01); *G06Q 10/087* (2013.01); *H04L 63/0428* (2013.01); *H04L 63/08* (2013.01); *H04L 51/02* (2013.01)

(58) Field of Classification Search
CPC ....... G06Q 10/087; G06Q 30/06–0645; G06Q 30/08; G06Q 50/01; G16Y 10/00–90; H04L 63/0428; H04L 63/08; H04L 51/02; H04L 51/52
See application file for complete search history.

(56) References Cited

U.S. PATENT DOCUMENTS

| | | | | |
|---|---|---|---|---|
| 9,785,959 B2 * | 10/2017 | Taylor | .................... | G06Q 30/06 |
| 10,643,230 B2 * | 5/2020 | Glazier | .............. | G06Q 30/0239 |

(Continued)

FOREIGN PATENT DOCUMENTS

| | | | | | |
|---|---|---|---|---|---|
| CN | 109661829 A | * | 4/2019 | ............ | H04W 48/12 |
| CN | 111314288 B | * | 8/2022 | .......... | H04L 61/4511 |

(Continued)

OTHER PUBLICATIONS

M. Conti, N. Dragoni and V. Lesyk, "A Survey of Man in the Middle Attacks," in IEEE Communications Surveys & Tutorials, vol. 18, No. 3, pp. 2027-2051, thirdquarter 2016, doi: 10.1109/COMST. 2016.2548426. (Year: 2016).*

*Primary Examiner* — Adam L Levine
(74) *Attorney, Agent, or Firm* — HSML.P.C

(57) ABSTRACT

A secure referral transfer includes receiving an offer for a connection agreement from a source, with the connection agreement defining data objects to be shared in transactions between the source and a target; receiving an acceptance of the offered connection agreement from the target; facilitating a connection between the source and the target based on the accepted connection agreement; and connecting a channel endpoint for the source and a channel endpoint for the target to facilitate a transaction. The secure referral transfer may be implemented without a direct integration of the infrastructure of the source and the target.

9 Claims, 6 Drawing Sheets

(56)  References Cited

U.S. PATENT DOCUMENTS

| | | | | |
|---|---|---|---|---|
| 2001/0037283 A1* | 11/2001 | Mullaney | ............... | G06Q 40/04 |
| | | | | 705/7.29 |
| 2009/0299907 A1* | 12/2009 | Cofano | ................. | G06Q 30/02 |
| | | | | 705/80 |
| 2014/0089117 A1* | 3/2014 | Schumacher | ......... | G06Q 20/02 |
| | | | | 705/40 |
| 2015/0317681 A1* | 11/2015 | Zamer | .................... | G06Q 30/08 |
| | | | | 705/14.58 |
| 2016/0104234 A1* | 4/2016 | McDonald | ......... | G06Q 30/0641 |
| | | | | 705/27.1 |
| 2019/0132732 A1* | 5/2019 | Bharti | ...................... | G02C 7/04 |
| 2019/0245682 A1* | 8/2019 | Alwen | .................. | H04L 9/3247 |
| 2020/0027139 A1* | 1/2020 | Nasreddine | ........ | G06Q 20/3674 |
| 2020/0090283 A1* | 3/2020 | Harrison | ............. | G06Q 10/103 |
| 2020/0204527 A1* | 6/2020 | Vass | .................... | H04L 63/0428 |

FOREIGN PATENT DOCUMENTS

| | | | | | |
|---|---|---|---|---|---|
| WO | WO-2012031262 A1 * | 3/2012 | ......... | G06Q 30/0214 |
| WO | WO-2014110951 A1 * | 7/2014 | ........ | H04W 36/0055 |
| WO | WO-2017011512 A1 * | 1/2017 | ........... | G06F 16/955 |

* cited by examiner

100

SWITCHBOARD PLATFORM
105

OFFER

CHANNEL AGREEMENT

TRANSFER

AGREEMENT

CHANNEL AGREEMENT

TRANSFER

CONNECTION AGREEMENT

SOURCE
110

TARGET
115

Figure 2:
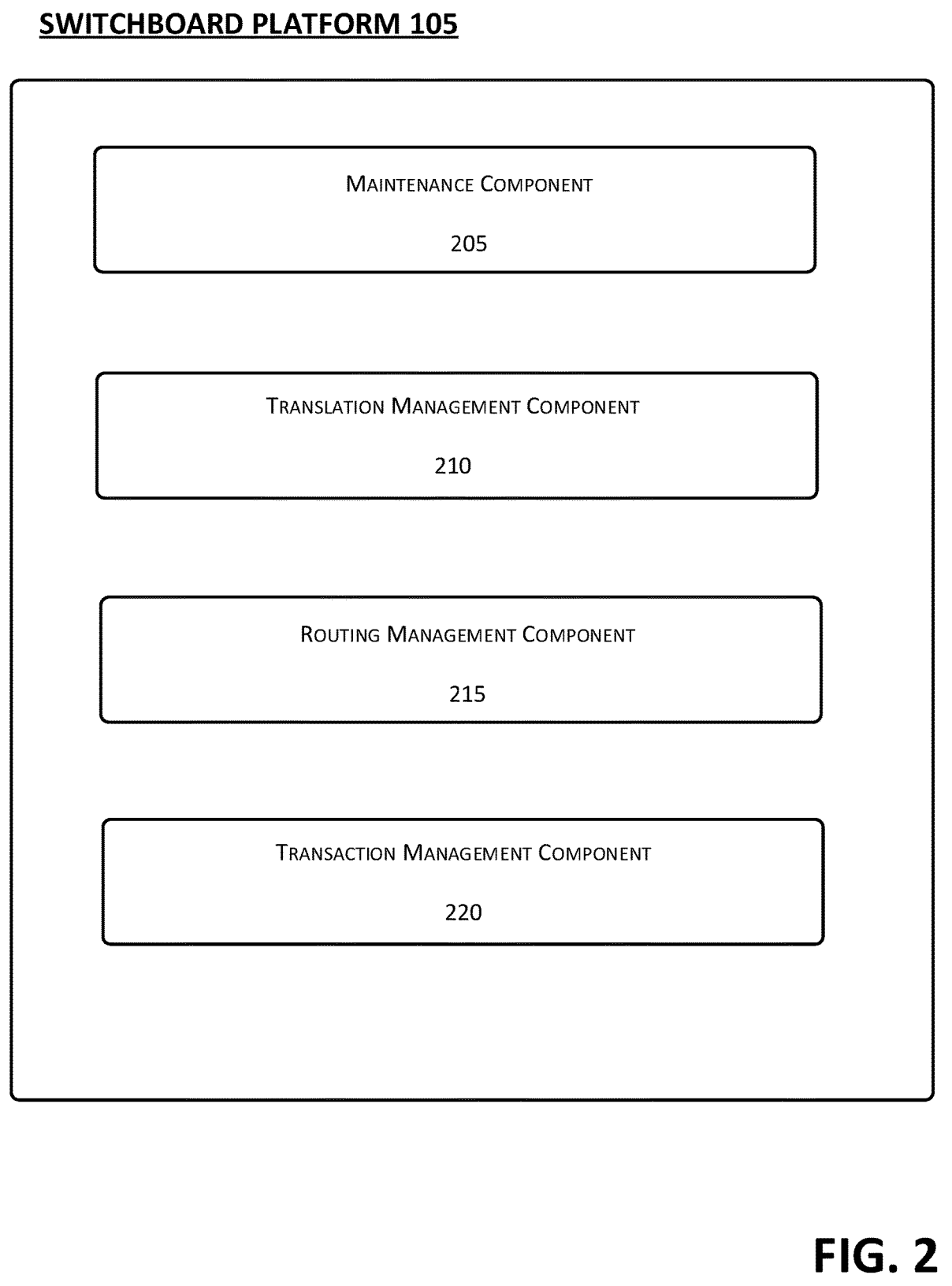

SWITCHBOARD PLATFORM 105

MAINTENANCE COMPONENT

205

TRANSLATION MANAGEMENT COMPONENT

210

ROUTING MANAGEMENT COMPONENT

215

TRANSACTION MANAGEMENT COMPONENT

SOURCE 110

MAINTENANCE COMPONENT

305

REFERENCE MANAGEMENT COMPONENT

TARGET 115

MAINTENANCE COMPONENT

405

REFERENCE MANAGEMENT COMPONENT

SWITCHBOARD PLATFORM
105

OFFER
525

SHARED DATA MODEL
530

CONNECTION AGREEMENT
535

SOURCE
110

TARGET
115

CHANNEL AGREEMENT
505

CHANNEL AGREEMENT
515

CHANNEL ENDPOINT
510

CHANNEL ENDPOINT
520

CHANNEL SESSION
540

TRANSFER
550

CHANNEL SESSION
545

REFERRAL
555

600

SECURE REFERRAL TRANSFER SERVICE

TECHNICAL FIELD

The embodiments described and recited herein pertain generally to connecting a user authenticated at a Source to a Supplier, without requiring an additional layer of authentication.

BACKGROUND

Referral-based transactions, via the Internet, are increasing in volume. By such transactions, a target, i.e., receiver or supplier, is to provide a product or service to a customer based on the referral of a source. Benefits from such transactions include an increased likelihood of an actual transaction, as opposed to the absence of a referral.

Typically, referral-based transactions may transact in one of the following three scenarios: (1) the source provides a code ("Promo Code") to the customer that, when entered into the target ecommerce website, is read by a series of matching discount codes stored in the ecommerce infrastructure to provide a discount or other benefit to the customer; (2) the source develops a co-branded website with a target so that all associated transactions are considered "referrals" by the target; and (3) the source facilitates a custom integration of part of its product delivery process with one or more targets, thereby allowing a referral transaction as part of the customer buying a product from the source, e.g., online transactions with customers buying a home appliance product to associated warranty or insurance services.

However, promo codes are often sent onward by receiving customers to code aggregation websites, which then make the codes available to a wider range of consumers, most of whom are not the intended customer base for either the source or the target. As a result, target margin may decrease and a "customer-only" impact for the source's customers may be diminished; co-branded target websites typically provide access only for the select customers, but may be viewed by all customers and competitors, are expensive to produce and/or maintain and require direct integration with authentication information; and direct integration of target offerings on a source website or other transaction infrastructure typically requires more expense for trained technology experts to implement the integration, and also typically requires integration of authentication information.

SUMMARY

Described and recited herein is a secure referral transfer service implemented by at least two web-based server components, along with associated web or other transactional infrastructure housed in or alongside the source's and target's websites or transactional infrastructure. The combination of the web-based components, integrated into the source's and target's websites or transactional infrastructures, enables the customer to be permitted access to unique features of the target's products and services without a direct integration of the two parties' transactional infrastructures or issuance of unique usernames and/or passwords or other unique identification of the consumer.

In accordance with at least one embodiment, a secure referral transfer method includes receiving an offer for a connection agreement from a source, with the connection agreement defining data objects to be shared in transactions between the source and a target; receiving an acceptance of the offered connection agreement from the target; facilitating a connection between the source and the target based on the accepted connection agreement; and connecting a channel endpoint for the source and a channel endpoint for the target to facilitate a transaction. The method may be implemented without a direct integration of the infrastructure of the source and the target.

In accordance with at least one other embodiment, a computer-readable medium stores computer-executable instructions thereon that, upon execution, cause one or more processors to facilitate a transaction by performing operations that include receiving a channel session linked to a channel endpoint for a source in accordance with a connection agreement; creating a transfer object to transfer extensible data objects, in accordance with the connection agreement, to a target; transferring the transfer object to a channel endpoint for a target; and validating the transfer for the target.

In accordance with at least one more embodiment, a system for conducting authenticated commerce. The system includes an authenticating server, a retailer website, and a vendor website. Operations performed by and within the system include the retailer website that receives a user selection of a product for purchase and encrypts a request that includes a string that indicates whether the user is authenticated on the retailer website and an identifier of a webpage for the selected product on a vendor website. The system also includes an authenticating server that decrypts the encrypted request; forms a comprehensive request by concatenating, to the decrypted request, objects that include a transfer identifier indicating that the user is authenticated on the retailer website; encrypts the comprehensive request; and transmit the encrypted comprehensive request to the vendor website. The system further includes the vendor website that decrypts the encrypted comprehensive request; transmits, to the authenticating server, a request for verification of the transfer identifier; grants the user access to the webpage for the selected product on the vendor website when the received verification indicates that the user is authenticated on the retailer website; and directs the user away from the webpage for the selected product on the vendor website when the received verification indicates that the user is not authenticated on the retailer website.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 2 shows a block diagram representing an example embodiment of a switchboard platform, in accordance with at least some embodiments described and recited herein;

FIG. 3 shows a block diagram representing an example embodiment of a source, in accordance with at least some embodiments described and recited herein;

FIG. 4 shows a block diagram representing an example embodiment of a target, in accordance with at least some embodiments described and recited herein;

DETAILED DESCRIPTION

Figure 1:
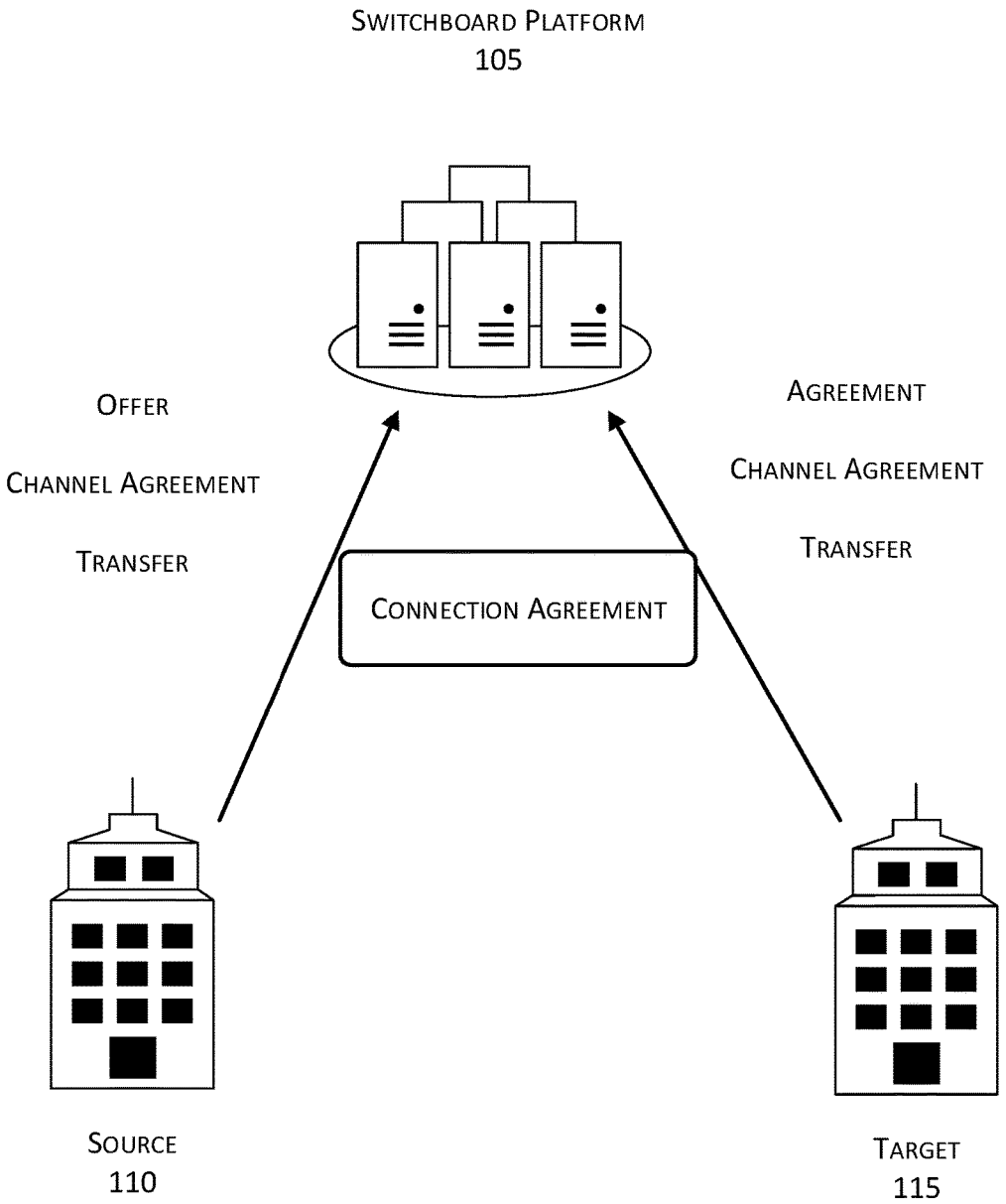
FIG. 1 shows a block diagram of entities included within a secure referral transfer service, in accordance with at least some embodiments described and recited herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows a block diagram of entities included within a secure referral transfer service, in accordance with at least some embodiments described and recited herein. As depicted, system 100 includes at least switchboard platform 105, source 110, and target 115. As will be described and recited herein, switchboard platform 105 facilitates a secure referral transaction for a client, consumer, or customer between source 110 and target 115. Accordingly, switchboard platform 105 is the facilitator of, from source 110, an offer, a channel agreement, and a transfer; also, switchboard platform 105 is the facilitator of, from target 115, an offer agreement, a channel agreement, and a transfer.

In the present description and recitation, the following terms may be used, in addition to their accepted meaning, as follows:

Switchboard platform 105 may refer to a platform-as-a-service that is programmed, designed, or otherwise configured to host, run, and manage programs and/or applications for a secure referral service between source 110 and one or more embodiments of target 115. Accordingly, as referenced, described, and recited herein, a switchboard platform may refer to one of multiple servers on the order of dozens to hundreds to thousands that may be hosted on a cloud-based infrastructure. The servers corresponding to switchboard platform 105 may refer to a high-performance computing (HPC) environment that includes, at least, a CPU and GPU. The servers may be configured, designed, or programmed to assemble, manage, compile, and/or execute a program for a secure referral and/or transactional service. More particularly, running on at least one of the multiple servers corresponding to the switchboard platform may be a compiler that is designed, programmed, or otherwise configured to execute operations to generate a function object ensemble for the program for a secure referral and/or transactional service.

Source 110 may refer to a professional or business entity, whether individual or corporate, having an online presence, e.g., commerce platform, website, application ("app"), Facebook® page, Instagram® page, etc. As referenced, described, and recited herein, a source may serve as a reference point for a target, for professional, commercial, or other business-related purposes.

Target 115 may refer to a professional or business entity, whether individual or corporate, having an online presence, e.g., commerce platform, website, application ("app"), Facebook® page, Instagram® page, etc. As referenced, described, and recited herein, a target may serve as a partner or point of referral for a source, for professional, commercial, or other business-related purposes.

An offer, as referenced, described, and recited herein, may be written in an object-oriented programming language, and may be intended to facilitate a cooperative agreement between source 110 and one or more embodiments of target 115. Non-limiting examples of such a cooperative agreement may include professional agreements and commercial agreements. Accordingly, an offer may include terms to which both source 110 and target 115 are to agree if a referral is to be considered to be consummated. Further, in accordance with at least one non-limiting example, an offer may be initiated by switchboard platform 105, either individually or in cooperation with source 110; or may be initiated or created by source 110, either individually or in cooperation with switchboard platform 115.

An offer may be regarded as an invitation to a partner (business/organizational) to share a transactional connection involving a third-party, i.e., customer, patient, etc., such that the third-party may be securely transferred concurrent with the data pertaining to the transaction, from source partner endpoint to target partner endpoint. The offer describes the business terms and rules each party will abide by in order to successfully service the third-party.

An offer may include business terms for how successful and/or unsuccessful transactions are to be accounted, between source 110 and target 115, and requirements for how the third-party, i.e., consumer or customer, shall be serviced. For example, a third-party shall be granted a 10% discount on any products purchased.

An offer, therefore, may include a description of transactional data objects and the associated security and access rights. As a non-limiting example, a retail sales order object may be defined such that target 115 may read and write an item sale price value but source 110 may only read the value.

Thus, non-limiting examples of objects included in an offer may include, but not be limited to, business terms and descriptions of data to be shared in transactions between source 110 and target 115. As a non-limiting example, in a retail relationship between source 110 and target 115, the offer may indicate that a retail referral object and a retail order object are to be shared between source 110 and target 115. The retail referral object may include elements on the order of dozens to hundreds to thousands, e.g., order line items, a skew for the line items, product identifiers, prices, discounts, etc.

An offer further includes objects that list or define channels that may be used to collaborate with targets. As described or recited herein, a channel may refer to a website, website connection, application, chatbot, or other Internet presence, e.g., Facebook® page, Instagram® page, etc. Accordingly, a channel may be regarded as a facilitator for the flow of data for a consumer or customer.

Further examples of objects included in an offer may include, but not be limited to, an indication as to whether either or both of source 110 or target 115 has rights to data created upon agreement to the offer, whether the rights are applicable to the data in portions or in entirety, etc.

A channel agreement, as referenced, described, and recited herein, may be written in an object-oriented programming language, and may include data objects produced subject to an accepted offer, describing or defining one or more channel endpoints for transactions executed based upon the accepted offer. Thus, for both source 110 and target 115, a channel agreement may include data objects that list, e.g., protocols to make a connection to the other of the source or target, URL parameters, encryption or other security parameters, encryption/decryption keys, etc.

A channel agreement may refer to a detailed specification for how a channel endpoint is to interact with services provided by switchboard platform 105 and/or the channel endpoint for the other of source 110 or target 115.

As a non-limiting example, the specification of a channel agreement may include type, location of connector code, payload encryption shared keys, connection method, payload construction patterns, payload parsing patterns, data transformation patterns, and target received data handling for content and/or workflow.

In accordance with the embodiments described and recited herein, source 110 and target 115 subject to an accepted offer separately produce a channel agreement, which may be regarded as an integration specification that provides parameters for integration between the source and the target in order to handle a live transfer of a transaction therebetween, without a direct integration of the transactional infrastructures of source 110 and target 115.

A connection agreement, hosted on the switchboard platform, provides a further specification for transactional traffic flow, i.e., connects a source channel endpoint identified in the source channel agreement to a target channel endpoint identified in the target channel agreement.

As a non-limiting example, the specification of a connection agreement may include type (e.g., one-way, round trip, bidirectional), connection duration, endpoint protocols, and endpoint performance expectations.

A channel endpoint may refer to a physical interface with which a live consumer, chatbot, etc., may connect, via an internet connection. Thus, non-limiting examples of a channel endpoint may include a website, an application, a chatbot, a social media page, etc.

A transfer may refer to the online presence of a third party, e.g., customer, being moved from a channel endpoint of the source to a corresponding endpoint, according to a channel agreement, of the target, and vice-versa.

As described and recited herein, switchboard platform 105, connected to source channel endpoint provides a customer with authenticated access to a target channel endpoint without requiring additional authentication for or from the consumer or customer, while still ensuring that only authenticated consumers or customers have access to the referred products and services. That is, the implementations and embodiments described and recited herein allow only authenticated patrons or customers of the source to visit a target's endpoint or transaction infrastructure, without referral transaction authentication and attribution.

FIG. 2 shows a block diagram representing an example embodiment of a switchboard platform, in accordance with at least some embodiments described and recited herein. As depicted, switchboard platform 105 includes at least maintenance component 205, translation management component 210, routing management component 215, and transaction management component 220.

A set forth above, switchboard platform 105, may refer to one of multiple servers on the order of dozens to hundreds to thousands that may be hosted on a cloud-based infrastructure that are programmed, designed, or otherwise configured to host, run, and manage programs and/or applications for a secure referral service between source 110 and target 115. Running on at least one of the multiple servers corresponding to switchboard platform 105 may be a compiler that is designed, programmed, or otherwise configured to execute operations to generate a function object ensemble for the program for a secure referral service.

Maintenance component 205 may refer to a module that is designed, programmed, or otherwise configured to create and maintain maintenance definitions for agreements, referrals, and transactions between source 110 and target 115. The maintenance definitions serve as a specification for the switchboard to route and translate inbound and outbound transactional transfers. The definitions also provide the switchboard with the rules for how a transfer transactional object, i.e., retail order, may be created or updated by either source or target endpoints.

Translation management component 210 may refer to a module that is designed, programmed, or otherwise configured, via maintenance component 205, to translate the protocols, data formats, and security parameters of an inbound transfer request from a source into the expected protocols, data formats, and security parameters that the target endpoint expects to receive.

Routing management component 215 may refer to a module that is designed, programmed, or otherwise configured, via maintenance component 205, to listen for an inbound connection from the source at predefined address and or port, receive the connection and using the configured routing table, via maintenance component 205, to direct the outbound connection request to the selected target supplied endpoint address.

Transaction management component 220 may refer to a module that is designed, programmed, or otherwise configured, via maintenance component 205, to handle the requests by either source or target endpoints to create or update the data object(s) linked to the transfer via the Connection Agreement and the data access rules that the source and target have agreed upon therein.

Figure 3:
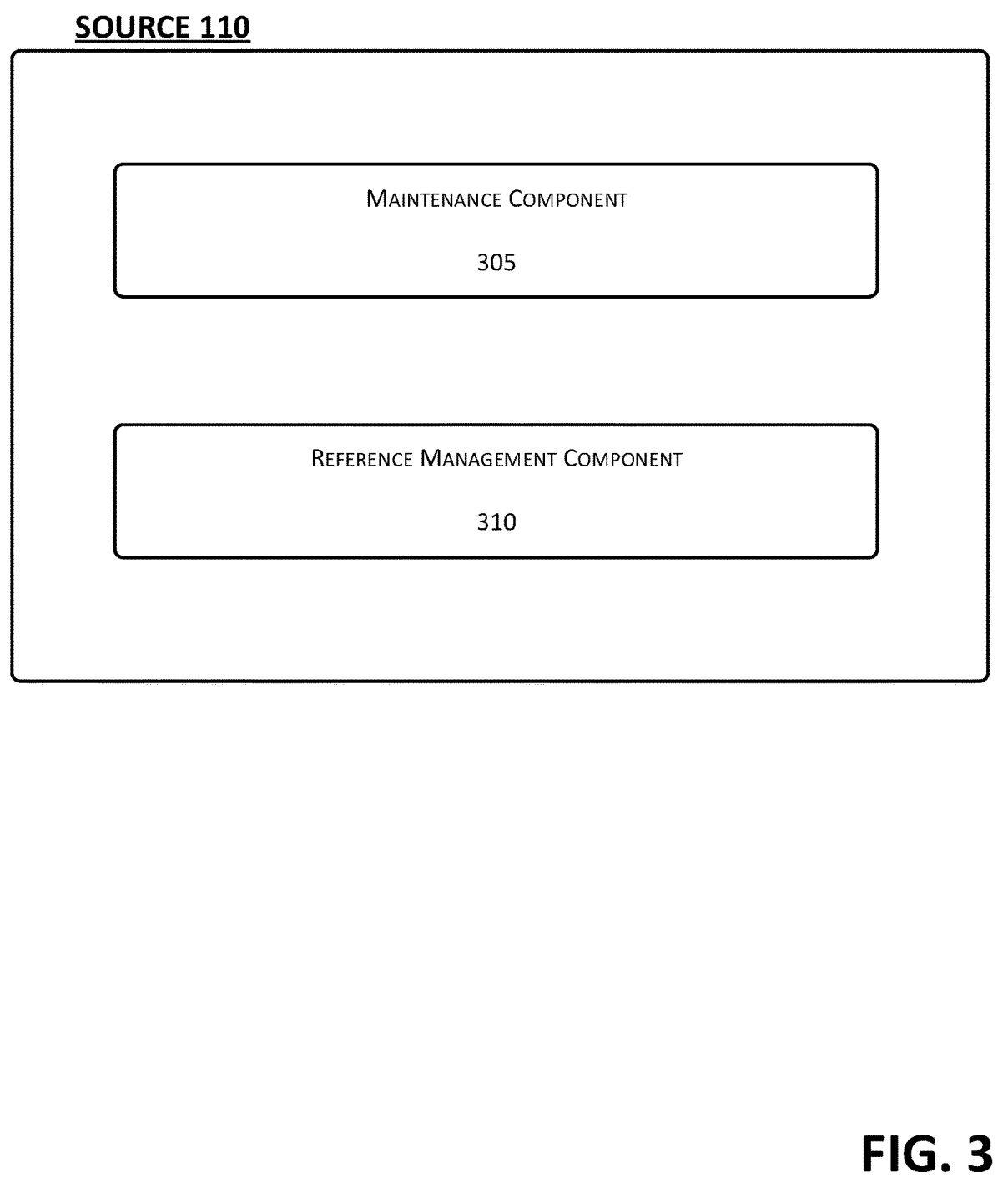

FIG. 3 shows a block diagram representing an example embodiment of a source, in accordance with at least some embodiments described and recited herein. As depicted, source 110 includes at least maintenance component 305 and reference/transaction management component 310.

As set forth above, source 110 may refer to a professional or business entity, whether individual or corporate, having an online presence, e.g., commerce platform, website, application ("app"), Facebook® page, Instagram® page, etc. As referenced, described, and recited herein, a source may serve as a reference point for a target, for professional, commercial, or other business-related purposes.

Maintenance component 305 may refer to a module that is designed, programmed, or otherwise configured to interface with maintenance component 205 of switchboard platform 105 to register source 110 as a partner organization or entity.

By maintenance component 305, source 110 may create an offer definition using offer creation pages or an offer creation interface provided by maintenance component 205 on switchboard platform 105.

Further, by maintenance component 305, source 110 may create a channel agreement and/or define a channel endpoint that may be linked to an offer using channel endpoint creation pages or a channel endpoint creation interface provided by maintenance component 205 on switchboard platform 105.

Further, by maintenance component 305, source 110 may install an endpoint connector component on the channel endpoint for source 110; and, further still, configure a plug-in adaptor to connect the channel endpoint for source 110 to switchboard platform 105, in accordance with the endpoint connector component.

Accordingly, maintenance component 305 facilitates an agreement and connection between source 110 and target 115 by linking connection agreement links in the channel endpoints for source 110 and target 115.

Reference/transaction management component 310 may refer to a module that is designed, programmed, or otherwise configured to receive a consumer or customer's agreement to be transferred from source 110 to target 115. The consumer or customer may be registered or subscribed or otherwise have privileged or secure access to the channel endpoint corresponding to source 110, and the customer's agreement may include special pricing on transactions facilitated by target 115.

Reference management component 310 may form a redirect link according to associated endpoint specification in the channel agreement and redirect the consumer or customer to management components 210, 215, and 220 corresponding to switchboard platform 105.

At or by management components 210, 215, and 220 corresponding to switchboard platform 105, the redirect link received from reference management component 310 may be matched to a corresponding connection agreement; and, according to the corresponding connection agreement, create objects including a channel session object, transactional data objects, and a transfer object; and, according to the connection agreement, form a redirect link and redirect the consumer or customer to reference management component 410 for target 115.

At or by reference management component 410 for target 115, the redirect link may be received from management components 210, 215, and 220 corresponding to switchboard 105, and a corresponding payload may be decrypted according to the connection agreement. A call may be returned to management components 210, 215, and 220 corresponding to switchboard 105 to validate the transferred connection data.

When the transferred connection data is validated by management components 210, 215, and 220 corresponding to switchboard 105, the consumer or customer may be granted unrestricted access to the connection endpoint corresponding to target 115. However, if an invalid response is received from management components 210, 215, and 220 corresponding to switchboard 105, the consumer or customer is denied access to the connection endpoint corresponding to target 115, receiving either a message indicating denied entry or being redirected therefrom.

Figure 4:
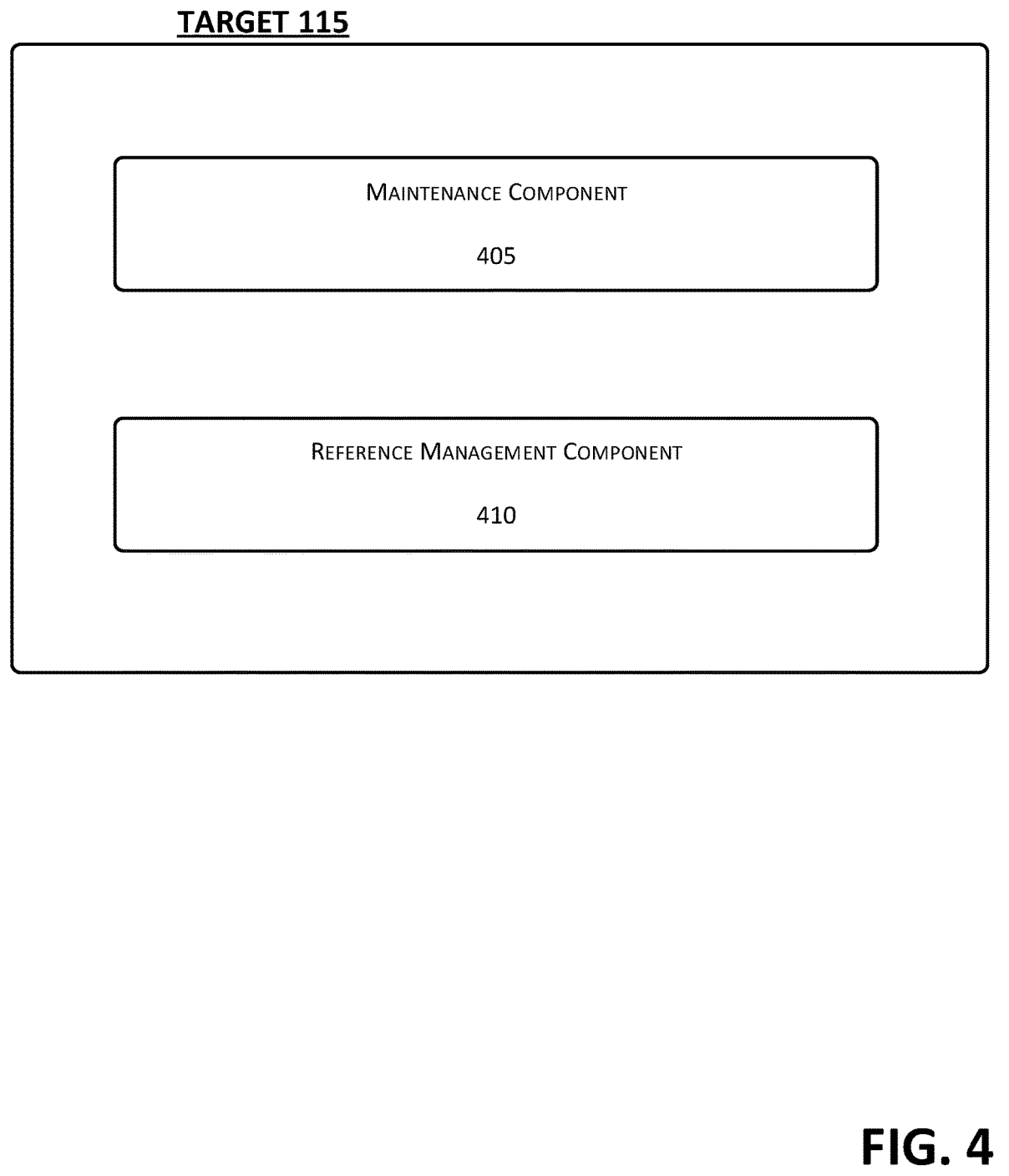

FIG. 4 shows a block diagram representing an example embodiment of a target, in accordance with at least some embodiments described and recited herein. As depicted, target 115 includes at least maintenance component 405 and reference/transaction management component 410.

As set forth above, target 115 may refer to a professional or business entity, whether individual or corporate, having an online presence, e.g., commerce platform, website, application ("app"), Facebook® page, Instagram® page, etc. As referenced, described, and recited herein, a target may serve as a partner or point of referral for a source, for professional, commercial, or other business-related purposes.

Maintenance component 405 may refer to a module that is designed, programmed, or otherwise configured to interface with maintenance component 205 of switchboard platform 105 to register target 115 as a partner organization or entity.

By maintenance component 405, target 115 may create an offer definition using offer creation pages or an offer creation interface provided by maintenance component 205 on switchboard platform 105.

Further, by maintenance component 405, target 115 may create a channel agreement and/or define a channel endpoint that may be linked to an offer using channel endpoint creation pages or a channel endpoint creation interface provided by maintenance component 205 on switchboard platform 105.

Further, by maintenance component 405, target 115 may install an endpoint connector component on the channel endpoint for target 115; and, further still, configure a plug-in adaptor to connect the channel endpoint for target 115 to switchboard platform 105, in accordance with the endpoint connector component.

Accordingly, maintenance component 405 facilitates an agreement and connection between target 115 and source 110, by accepting the connection agreement created by maintenance component 305 corresponding to source 110.

Reference/transaction management component 410 may refer to a module that is designed, programmed, or otherwise configured to create representations of orders according to data handling specifications defined in the offer.

Figure 5:
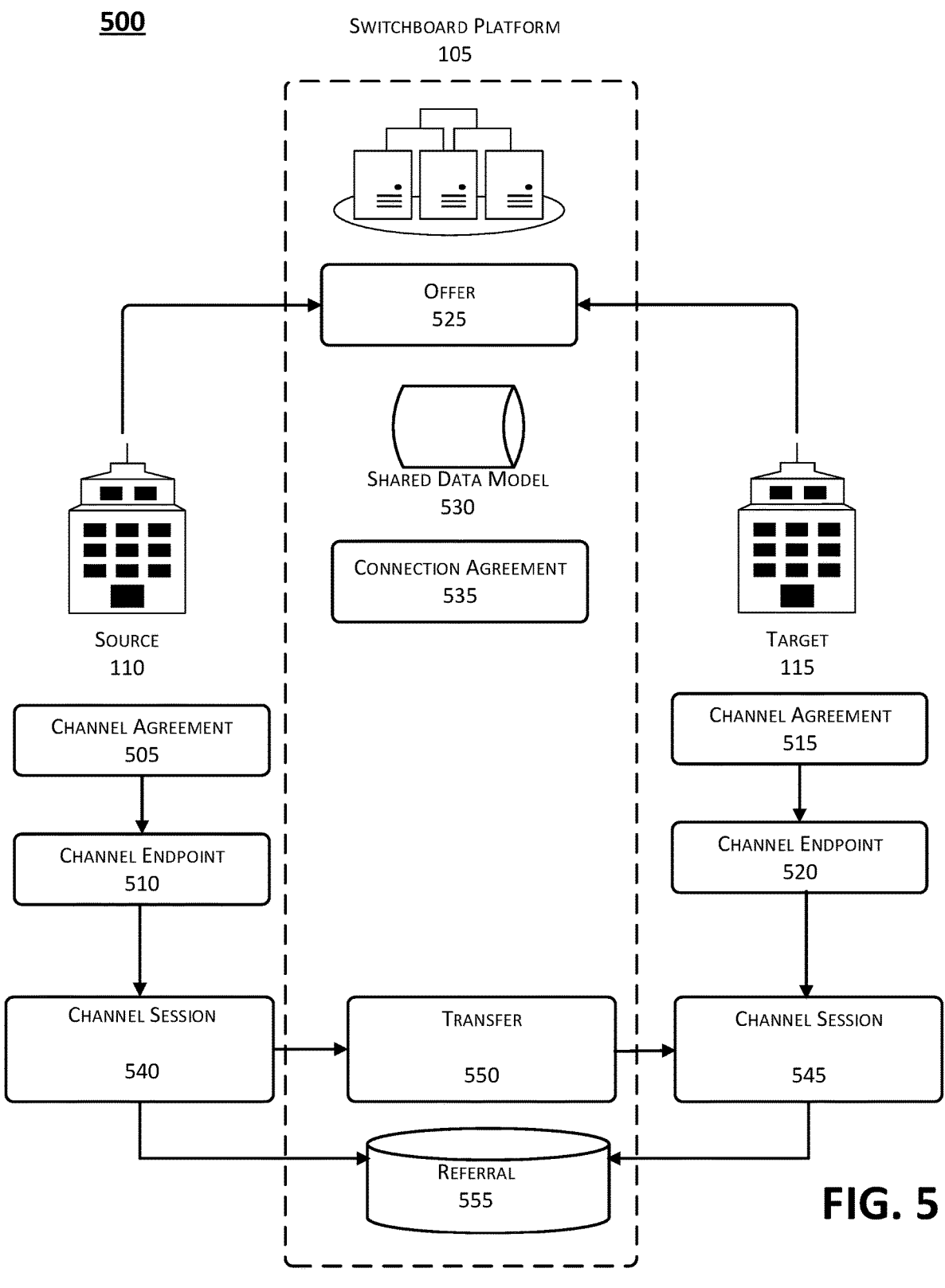
FIG. 5 shows a block diagram of entities and/or components included within a secure referral transfer service, in accordance with at least some embodiments described and recited herein.

FIG. 5 shows a block diagram of entities and/or components included within a secure referral transfer service, relative to system 100 shown in and described with reference to FIGS. 1-4, in accordance with at least some embodiments described and recited herein. As depicted, system 500 includes at least switchboard platform 105, source 110, and target 115. On source 110, the following may be produced, generated, and/or defined: channel agreement 505, channel endpoint 510, and channel session 540. On switchboard platform 105, the following may be produced, generated, and/or defined: offer 525, shared data model 530, connection agreement 535, transfer object 550, and referral 555. On target 115, the following may be produced, generated, and/or defined: channel agreement 515, channel endpoint 520, and channel session 545.

In accordance with the non-limiting example embodiments of a secure referral transfer service described and recited herein, source 110 creates offer 525.

Offer 525, as referenced, described, and recited herein, may refer to an extensible object that includes business terms and a definition of channels that may be used to collaborate with potential referral partners, including but not limited to target 115.

Non-limiting examples of a channel may include, but not be limited to, a website, a website connection, application, chatbot, or other Internet presence, e.g., social media page. Accordingly, a channel may be regarded as a facilitator for the flow of data, on which a live user connection may flow.

Offer 525 may also include objects that describe or define data that is to be used for transactions from one channel to another channel. In accordance with at least one non-limiting example, offer 525 may include a retail referral object and a retail order object. Thus, target 115 accepting terms of offer 525 agrees that shared data model 530 includes, at least, a retail referral object and a retail order, as defined by the objects of offer 525.

In accordance with the non-limiting example embodiments described and recited herein, a retail referral object may include data elements on the order of tens or even hundreds, including, e.g., but not limited to, retail order, order line items, a skew for the line items, product identifier, price, any discount, fulfillment, etc.

Further, the retail referral object may also include a description or definition of whether particular data elements are to be visible to source 110, target 115, or both. That is, of the data elements included in a retail referral object, some may be solely viewable and/or accessible by source 110; some solely viewable and/or accessible by target 115; and some may be shared by both source 110 and target 115. Further still, the retail referral object may include a description of read and write access privileges for respective data elements included therein, as described or defined in offer 525.

Offer 525, in accordance with at least some non-limiting example embodiments described and recited herein, may be regarded as an extensible object that defines or describes, at least, which of source 110 and target 115 has rights to data created as part of a referral transaction, defines or describes channels to be used in the referral transaction, and defines shared data model 530 to be used between source 110 and target 115 for the referral transaction without implementing a direct integration of the infrastructure of the source and the target. That is, shared data model may restrict access to data elements, to target 115, based upon shared data model settings or settings in the offer.

In accordance with at least one non-limiting example embodiment of a secure referral transfer service, source 110 creates or defines channel agreement 505.

Channel agreement 505, created or defined by source 110, may refer to an extensible object that describes or defines services to be included in a referral transaction between source 110 and target 115. Non-limiting examples of such services may include professional services or commercial transactions offered to a restricted set of consumers or customers, e.g., subscribers to services provided by source 110.

Channel agreement 505 may further describe or define channel endpoint 510 to which channel agreement 505 may pertain, and further describe or define, e.g., protocols, URL parameters, encryption/decryption keys, payloads specifications, etc., to connect channel endpoint 510 corresponding to target 115 to channel endpoint 510 corresponding to source 110.

Channel endpoint 510 may be a website, an application, a chatbot, a social media page, etc.

Having been availed of offer 525 and channel agreement 505, target 115 may agree to the terms described and/or defined in offer 525, thus indicating that target 115 is to become a transactional endpoint for referral by source 110.

In accordance with the non-limiting example embodiments of a secure referral transfer service described and recited herein, target 115 creates channel agreement 515.

Channel agreement 515, created or defined by target 115, may refer to an extensible object that describes or defines services to be included in a referral transaction between source 110 and target 115. Non-limiting examples of such services may include professional services or commercial transactions offered to a restricted set of consumers or customers, e.g., subscribers to services provided by source 110.

Channel agreement 515 may further describe or define channel endpoint 520 to which channel agreement 515 may pertain, and further describe or define, e.g., protocols, URL parameters, encryption/decryption keys, payloads specifications to connect with channel endpoint 520 corresponding to target 115.

Channel endpoint 520 may be a website, an application, a chatbot, a social media page, etc.

Accordingly, channel agreement 505 and channel agreement 515 may be regarded as integration specifications, listing or defining how source 110 and target 115 are to integrate, manage, and handle a live transfer of a business transaction between channel endpoint 510 and channel endpoint 520.

Connection agreement 535, manifested upon agreement between source 110 and target 115, may refer to an extensible object that connects channel endpoint 510 to channel endpoint 520 on the live or active switchboard platform 105 but without implementing a direct integration of the transactional infrastructures of source 110 and target 115.

Channel session 540 may be created on or by source 110 when triggered by the presence or some form of activation by a consumer or customer on channel endpoint 510. That is, channel session 540 may be linked to channel endpoint 510 and channel agreement 505.

Transfer object 550 may refer to an extensible object created on or by source 110 to implement a secure referral transaction between source 110 and target 115.

Further, shared data, which may be defined or described in offer 525, may be created. That is, according to the non-limiting example referenced above, a retail referral object and a retail order object may be created and connected to transfer object 550 and channel session 540.

Accordingly, transfer object 550 for the live consumer or customer session may be linked to connection agreement 535, resulting in a live consumer or customer session being connected from channel endpoint 510 to channel endpoint 520.

Channel session 545 may be created on or by target 115 when triggered by the receipt of channel session 540 and detection of transfer object 550 at channel endpoint 520. Channel session 545 may be linked to channel endpoint 520 and channel agreement 515.

Accordingly, a secured referral transaction is established by which channel session 540 and channel session 545 are connected, with transfer object 550 and shared data model 530 therebetween.

Referral 555 may refer to the sum of all data and objects sent from Source to Switchboard, From Switchboard to Target, and from Target to switchboard. This includes the transfer, transfer details, any potential orders made at the target linked to this transfer. Data in the referral is visible to the source and target as specified in the Shared Data model.

Figure 6:
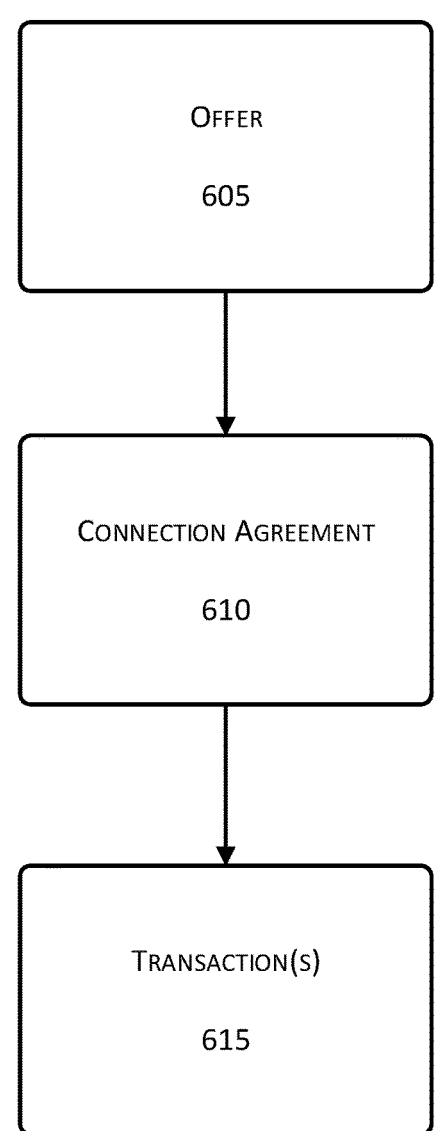
FIG. 6 shows a high-level overview of a processing flow for a secure referral transfer, implemented in accordance with at least some embodiments described and recited herein

FIG. 6 shows a high-level overview of a processing flow for a secure referral transfer, implemented in accordance with at least some embodiments described and recited herein.

As depicted, processing flow 600 includes the basic processes for a secure referral transfer executed by various components of switchboard platform 105, source 110, or target 115. However, processing flow 600 is not limited to such processes and/or operations, as obvious modifications may be made by re-ordering the processes or operations described here, eliminating facets of the processes or operations, adding further facets, etc. Processing flow 600 may include various operations, functions, or actions as illustrated by one or more of blocks 605, 610, and 615. These various operations, functions, or actions may, for example, correspond to software, program code, or program instructions executable by a digital processor that causes the functions to be performed. Processing may begin at block 605.

Block 605 (Offer) may refer to the maintenance or establishment of a referral and transactional relationship between source 110 and target 115, facilitated by switchboard platform 105, without an integration of transactional infrastructures of source 110 and target 115.

Block 605 may entail source 110 creating offer 525 for review and/or acceptance by one or more embodiments of target 115. In accordance with at least one alternative embodiment, offer 525 may be created jointly by source 110 and switchboard platform 105. In accordance with a non-limiting example of secure referral transactions, offer 525 may be stored on or at switchboard platform 105.

Regardless, offer 525 may be written in an object-oriented programming language, and may be intended to facilitate a cooperative agreement between source 110 and one or more embodiments of target 115. Non-limiting examples of such a cooperative agreement may include professional agreements and commercial agreements. Offer 525 may include, as non-limiting examples, business terms and descriptions of data to be shared in transactions between source 110 and target 115, including but not limited to a retail referral object and a retail order object, as described above. Offer 525 further includes objects that list or define channels that may be used to collaborate with targets, e.g., a website, website connection, application, chatbot, or other Internet presence, e.g., Facebook® page, Instagram® page, etc. That is, a channel may be regarded as a facilitator for the flow of data for a consumer or customer. Offer 525 may still further include one or more objects that define or describe whether either or both of source 110 or target 115 has rights to data created upon agreement to the offer, whether the rights are applicable to the data in portions or in entirety, etc.

Block 610 (Connection Agreement) may refer to target 115 agreeing to offer 525 on switchboard platform 105. Upon agreement, source 110 generates channel agreement 505, and target 115 generates channel agreement 515. The connection agreement links the respective channel agreements for source 110 and target 115 for a particular channel endpoint.

Both channel agreement 505 and channel agreement 515 define or describe one or more channel endpoints, for source 110 and target 115 respectively, for transactions based on offer 525. Thus, for both source 110 and target 115, a channel agreement may include data objects that list, e.g., protocols to make a connection to the other of the source or target, URL parameters, encryption or other security parameters, encryption/decryption keys, etc., resulting in an integration specification that provides parameters for integration between source 110 and target 115 in order to handle a live transfer of a transaction therebetween, without exposing, revealing, or sharing respective transactional infrastructure to the other.

Connection agreement 535, hosted or otherwise facilitated on switchboard platform 105, in accordance with the definitions or descriptions in the respective channel agreements, connects a channel endpoint corresponding to source 110 to a channel endpoint corresponding to target 115.

Block 615 (Transaction(s)) may refer to a consumer or customer being transferred from the channel endpoint corresponding to source 110 to the channel endpoint corresponding to target 115.

More particularly, in accordance with at least one non-limiting example embodiment, block 615 may include a consumer or customer accessing the channel endpoint corresponding to source 110 that is defined or described in channel agreement 505. Further, switchboard platform 105 may create a channel session that is linked to the channel endpoint corresponding to target 115 that is defined or described in channel agreement 515.

When the consumer or customer clicks a link on the channel endpoint corresponding to source 110 to transfer, or otherwise attempts to transfer, to the channel endpoint corresponding to target 115, source 110 encrypts information regarding the consumer or customer and the consumer/customer relationship with source 110 as part of a query string that is included in the channel session 540. That is, source 110 builds the query string that includes, e.g., the name and membership information regarding source 110, and encrypts the query string using the specification of channel endpoint 510.

Upon receipt of the encrypted query string, switchboard platform 105 may create transfer object 550, which may be linked to connection agreement 535, as well as a session object. Further, the shared data, in accordance with shared data model 530 may be created. That is, a retail referral object and a retail order object may be created and connected to transfer object 550 and the channel session.

The consumer or customer may then be granted access to the channel endpoint corresponding to target 115, which receives the channel session, receives the transfer, and creates a channel session on that channel endpoint, with the channel session including the retail order or the retail referral object.

Accordingly, block 615 includes a transaction having two channel sessions, one corresponding to source 110 and one corresponding to target 115, and transfer object 550 therebetween.

Upon receiving transfer object 550 from switchboard platform 105, target 115 may validate and store the transfer token that was transmitted from switchboard platform 105.

At switchboard platform 105, the transfer token may be authenticated to thereby validate the transfer for security at target 115. Switchboard encrypts transfer object 550, including the transfer token, and returns the encrypted string to target 115, resulting in a live session for the consumer or customer on channel endpoint 520 at target 115.

However, if the transfer token is not validated at switchboard platform 105, channel endpoint 105 may prevent full access thereto to the consumer or customer.

In accordance with at least some of the embodiments of a secure referral transfer service described and recited herein, a user may access a link on a website or other transactional infrastructure corresponding to source 110. Examples of a transactional infrastructure may include, but not be limited to, a call center or agent, text client, voice application, video or TV application, visual-cuing application for people with visual impairment, etc. In addition, a link or code may be provided to the consumer or customer on marketing materials, on product packaging or via other methods, including projection on a video screen not connected to the internet, such as a television.

A consumer or customer may view a list of possible referral opportunities presented as a list of target links, titles or other representations, e.g., photographs having search-enabled access. This link may be statically displayed as a list or be dynamically created by the infrastructure corresponding to the source by reading the number of integrated targets currently on the switchboard platform, based on the type of customer or inferences made about the customer by one or more sources of information attached to the source's transactional infrastructure.

In the list of benefit links, an address (web URL or other address type) may be coded to an associated list of targets, which may provide an appropriate benefit to the customer. This list of associated benefits may be hard-coded to the list of benefits displayed to the customer or the list of benefits may be dynamically connected where the associated target's infrastructure may change based on product availability, language, match to a particularly customer's needs or desires, or some other criteria such as seasonality, location or regulatory criteria.

When a customer device chooses the link, the source's infrastructure may retrieve information from the customer interaction on the source's infrastructure, which may or may not include authentication, e.g., name, customer number, etc., and encrypts the retrieved information into a secure package to be sent to the switchboard platform.

Upon receipt of the encrypted package of information from the source's infrastructure, the switchboard platform may perform the following operations:

decrypts the package of information sent by the source's infrastructure, and matches it to one or more of the associated target's infrastructure(s);

creates a unique transfer ID based on a globally unique identifier (GUID) that identifies the customer's referral attempt, and logs that transfer ID to a secure list within the switchboard platform;

encrypts the package with the transfer ID and/or the customer information provided by the source's infrastructure; noting that the transfer ID may include additional information, such as a termination date for the transfer to be valid, time codes, inferred data based on location or type of device used, and other information based on the agreements between the source and target; and sends the encrypted package to the target's infrastructure.

Upon receipt of the encrypted package of information from the switchboard platform, the target's infrastructure may perform the following operations:

decrypts (if necessary) the package of information sent by the switchboard platform; and sends a message with the unique transfer ID back to the switchboard platform, asking for confirmation in the form of one of the following non-limiting examples:

"yes" if the transfer ID and related information matches the list stored in the switchboard platform; or "no" or "maybe" if the transfer ID and related information do not match a stored transfer ID stored on the switchboard platform, or has some other issue or inconsistency as defined by the source and target, i.e., target, in their legal and/or operational agreements.

Upon receipt of the encrypted request from the target's infrastructure for a confirmation of the transfer ID's validity, the switchboard platform may perform the following operations:

send an "OK" message back to the target's infrastructure to allow the customer to access specific components of the target's infrastructure, such as pages with products having special pricing/benefits for the customer;

in the case of a "non-match", the switchboard platform may send a "No", or "Maybe" message to the target's infrastructure that instructs the target's infrastructure to institute an alternative workflow. For instance, the target's infrastructure may instruct the customer to go back to the source's infrastructure and attempt another transfer. Alternatively, the target's infrastructure may request additional information itself to verify the identity or intention of the Customer.

Once the target's infrastructure receives the previous "Yes", "No" or "Maybe" answer from the switchboard platform, the target's infrastructure may perform one or more of the following operations:

provide access to the customer to selected components of the target's infrastructure, such as specially priced products, unique information valuable to the customer, etc.;

allow access to some components of the target's infrastructure even if the SRTS Platform has indicated "no" or "maybe", such as information on customer service, product returns. Thus, users who have previously purchased from a target's infrastructure may return later to check on their order status without having to visit the source's infrastructure again for validation;

send additional messages to the customer, such as offers or other communications that have been approved between the source and target in their various agreements;

send additional messages to the source's infrastructure, such as the status of a particular Customer's behavior or access on the target's infrastructure, or information that the Sender can relay back to the customer for some purpose; and send the customer along to a series of other targets, as if the target has now become a source.

In the foregoing description and the following recitation, the following applies in non-limiting implementations:

Switchboard platform "Source to Switchboard Platform" parameters:

Source and switchboard platform may share a unique encryption scheme, e.g., symmetric key, public private key pair, etc.

Source and switchboard platform may share the referral payload definition/schema, e.g., URL parameter string: ref1=Connection Agreement ID; ref2=Customer First Name; ref3=Customer Last Name; ref3=Customer Benefit Tier, etc.).

Source and switchboard platform may share a protocol definition for transferring the customer connection and referral payload from Sender to Switchboard (e.g., HTTP GET, HTTP POST, SIP, etc.).

Switchboard platform "Source to Switchboard Platform Transfer" operations:

1. Source may validate customer and collects customer/referral data matching referral payload definition.
2. Source constructs transfer payload matching referral payload definition.
3. Source encrypts payload using shared encryption scheme.
4. Source transfers the customer connection and referral payload via the shared transfer protocol definition to the Switchboard.

Switchboard platform "Switchboard Receive Transfer" operations:

1. Switchboard platform locates source ID during protocol handshake negotiation or from the referral payload as defined in transfer protocol definition.
2. Switchboard platform fetches shared key from storage and decrypts referral payload. If the key fetch operation fails the transfer is aborted.
3. Switchboard platform decrypts referral payload and validates the payload contents against the shared payload definition. If validation fails the transfer is aborted.
4. Switchboard platform creates a unique referral transfer session and transfer object containing a unique transfer ID and commits it to storage.
5. Switchboard platform executes transfer to referral target steps (Switchboard to Target Transfer Steps).

Switchboard platform "Switchboard to Target" parameter:

Switchboard platform and target share a unique encryption scheme (e.g., symmetric key, public private key pair, etc.).

Switchboard platform and target share the referral payload definition/schema (e.g., URL parameter string: ref1=Transfer ID; ref2=Customer First Name; ref3=Customer Last Name; ref3=Customer Benefit Tier, etc.).

Switchboard platform and target share a protocol definition for transferring the customer connection and referral payload from Switchboard to Target (e.g., HTTP GET, HTTP POST, SIP, etc.).

Switchboard platform and target share a transfer validation protocol to be used for validating incoming referral transfers (e.g., HTTP GET ValidateTransfer param=Transfer ID, Success=200 OK).

Switchboard platform "Switchboard to Target Transfer" operations:

1. Switchboard platform computes target endpoint via applying previously defined rules against the inbound referral payload.
2. Switchboard platform constructs transfer payload matching selected target referral payload definition.
3. Switchboard platform encrypts payload using shared encryption scheme.
4. Switchboard platform transfers the customer connection and referral payload via the shared transfer protocol definition to the target endpoint.

Switchboard platform "Target Receive Transfer" operations:

1. If necessary, the target decrypts referral payload using shared key scheme and validates the payload contents against the shared payload definition. If validation fails the transfer is aborted.
2. Target locates the unique transfer ID from the referral payload.
3. Target calls the switchboard platform to validate the transfer ID.
4. If the transfer ID is valid, the target allows the customer connection to access defined products/services.

If the transfer ID is not valid, the target does not allow the customer connection to access defined products/services.

As set forth above, described and recited herein are methods, programs, systems, apparatuses, and components pertaining to the compilation of a Turing-complete quantum programming language, of which there are no known equivalents for practical quantum computers.

From the foregoing, it will be appreciated that various embodiments of the present disclosure have been described and recited herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A non-transitory computer-readable medium storing computer-executable components of a switchboard platform thereon, the computer-executable components comprising:
   a maintenance component configured to create and maintain definitions for agreements, referrals, and transactions; and
   management components configured to:
      translate protocols, data formats, and security parameters,
      detect a connection, and manage requests to create or update data objects linked to a transfer of extensible data objects,
   wherein, upon execution, the computer-executable components cause one or more processors to facilitate a secure referral transaction between respective internet-based transactional infrastructures of a source website and a target website by performing operations comprising:
      receiving, by at least one of the management components, a channel session linked to an internet-connected channel endpoint for the source website in accordance with a connection agreement;
      creating, by at least one of the management components, a transfer object to transfer extensible data objects, in accordance with the connection agreement, for the target website;
      transferring, by at least one of the management components, the transfer object to an internet-connected channel endpoint for the target website;
      receiving, by at least one of the management components, a validation call from the internet-connected channel endpoint for the target website for the transfer to the target website,
         wherein the validation call is sent from the internet-connected channel endpoint for the target website upon decryption and inspection of the transfer object; and
      establishing, by at least one of the management components, the secure referral transaction, in which access to various data elements is restricted to at least one of the source website or the target website as specified in at least one of the transferred extensible objects, by granting access from the source website to the internet-connected channel endpoint for the target website, as a secure channel session for the secure transaction, when the transfer for the target website is validated,
         wherein the connection agreement is an extensible data object manifested upon agreement by the source website and the target website, to securely connect the internet-connected channel endpoint for the source website and the internet-connected channel endpoint for the target website and prevents exposure of transactional infrastructure to the other of the source website and the target website.

2. The non-transitory computer-readable medium of claim 1,
   wherein the channel endpoint for the source is defined in a source channel agreement, and
   wherein the channel endpoint for the target is defined in a target channel agreement.

3. The non-transitory computer-readable medium of claim 1, wherein the transfer object includes a transfer token.

4. The non-transitory computer-readable medium of claim 3, wherein the operations further comprise:
   receiving the transfer token back from the target; and
   transmitting a validation message to the target.

5. The non-transitory computer-readable medium of claim 1, wherein the transfer object indicates that a user has been authenticated at the source.

6. The non-transitory computer-readable medium of claim 1, wherein the computer-readable medium is stored on a cloud-based authentication server.

7. The non-transitory computer-readable medium of claim 1, wherein the target is a target commerce site that is restricted to authenticated users.

8. The non-transitory computer-readable medium of claim 1, wherein a transaction is completed at the target.

9. The non-transitory computer-readable medium of claim 1, wherein the transfer object is encrypted.

* * * * *